No. 624,142. Patented May 2, 1899.
R. S. WHITE.
MEANS FOR REDUCING FRICTION IN ROTATING SHAFTS OF ELECTRIC METERS.
(Application filed Oct. 5, 1898.)
(No Model.) 2 Sheets—Sheet 1.

No. 624,142. Patented May 2, 1899.
R. S. WHITE.
MEANS FOR REDUCING FRICTION IN ROTATING SHAFTS OF ELECTRIC METERS.
(Application filed Oct. 5, 1898.)
(No Model.) 2 Sheets—Sheet 2.

UNITED STATES PATENT OFFICE.

ROGER S. WHITE, OF NEW YORK, N. Y.

MEANS FOR REDUCING FRICTION IN ROTATING SHAFTS OF ELECTRIC METERS.

SPECIFICATION forming part of Letters Patent No. 624,142, dated May 2, 1899.

Application filed October 5, 1898. Serial No. 692,674. (No model.)

*To all whom it may concern:*

Be it known that I, ROGER S. WHITE, a citizen of the United States, residing at New York, (Brooklyn,) in the county of Kings and State of New York, have invented a certain new and useful Improvement in Means for Reducing Friction in Rotating Shafts of Electric Meters and other Devices, of which the following is a specification.

My invention relates to improvements in means for reducing the friction in rotating shafts, such as the armature-shafts of electricity-meters, wherein the registration is effected by the rotation of an armature influenced by the current to be measured in whole or in part.

The object of my invention is to provide certain means by which the friction of a rotating shaft may be almost entirely eliminated.

In an application for Letters Patent filed September 2, 1898, Serial No. 690,129, I describe certain improvements in motor-meters, which meters are characterized by the employment of a flat armature of relatively large diameter, but of great lightness, by reason of which characteristics such a motor will be possessed of great accuracy and will be instantly susceptible to changes in current. The employment of an armature having a relatively large diameter, if mounted on a vertical shaft, necessitates the employment of an inclosing casing having an objectionable width with respect to its height. By means of my present invention it is possible in the construction of my improved motor-meters to operate the armature-shaft in a horizontal plane, and at the same time friction at the bearings will be almost entirely eliminated. By thus mounting the armature-shaft in a horizontal plane a much better proportioned meter is obtained and one which will be better suited for attachment to a wall in use.

While my present improvements are designed particularly for use in connection with meters for the measurement of electricity, it will be possible to carry the invention into effect in connection with any rotating shaft with respect to which it is desired to reduce or practically eliminate the friction at the bearings—such, for example, as in chronometers and other registering devices.

In order that my invention may be better understood, attention is directed to the accompanying drawings, forming part of this specification, and in which—

Figure 1:
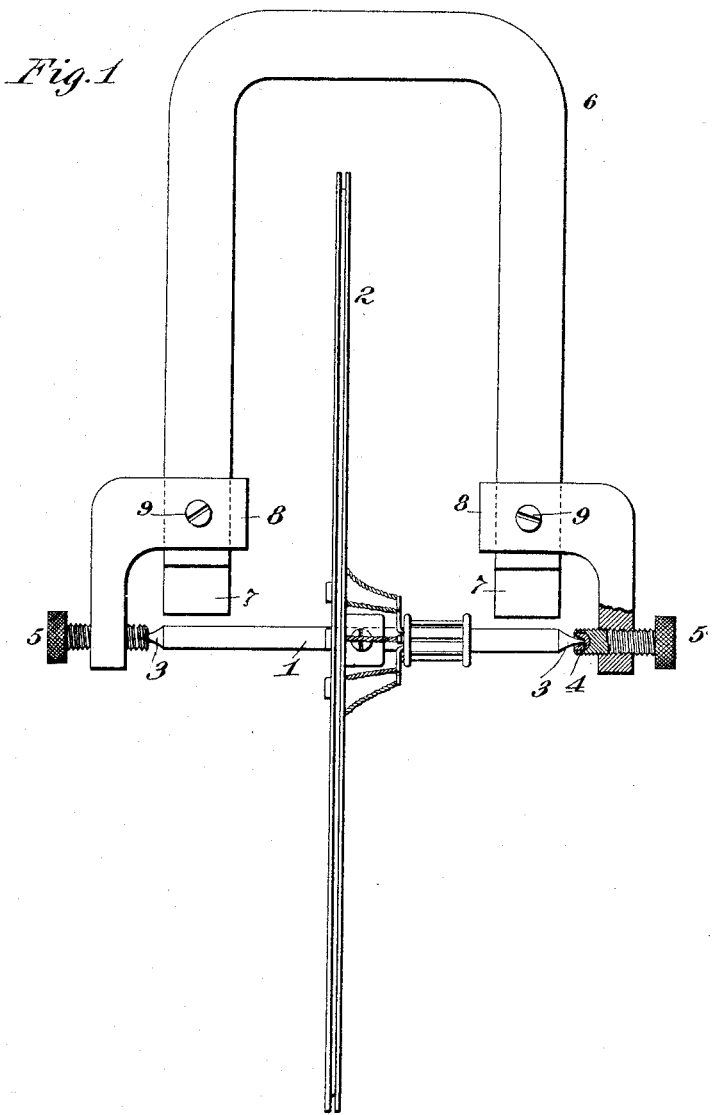
Figure 2:
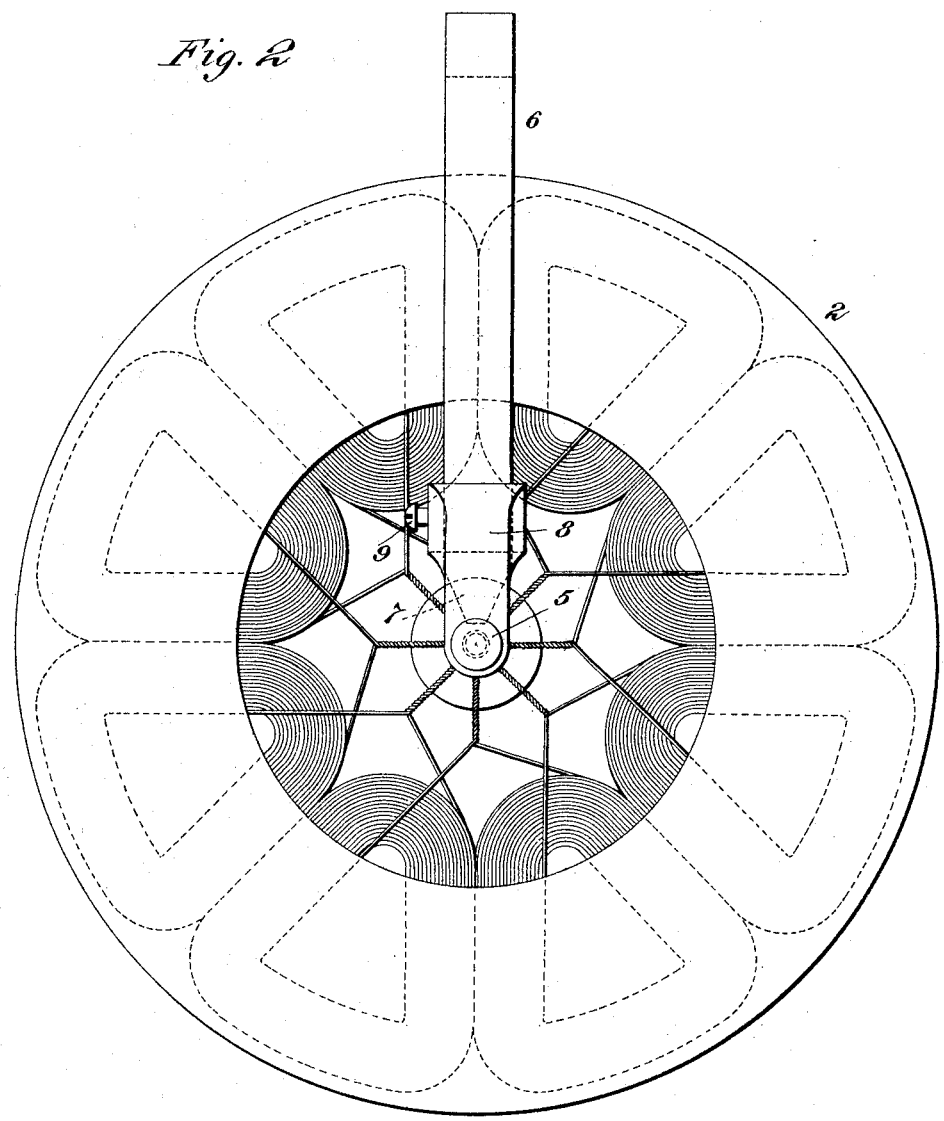

Figure 1 is a side elevation, partly in section, showing an armature-shaft having a flat armature thereon, such as I have described in my said application, combined with a horseshoe-magnet, by which the friction of the shaft, turning in a horizontal plane, may be relieved or entirely removed from the end bearings thereof; and Fig. 2, a front elevation of the same.

In both of the above views corresponding parts are represented by the same numerals of reference.

1 represents a rotating shaft turned in any suitable way and performing any work. I illustrate an armature 2 secured to this shaft and of the general type described in my application before referred to. The shaft 1 is illustrated as turning in a horizontal plane and at each end is preferably reduced in size at 3 3. These reduced portions are preferably mounted in cup-like jewels 4 4, each of which is carried on the end of an adjusting-screw 5. Mounted above the shaft 1 is a preferably permanent magnet 6, the two poles 7 7 of which are arranged adjacent to the ends of the rotating shaft 1. The adjusting-screws 5 are preferably carried in suitable brackets 8, preferably of non-magnetic material, such as brass, which brackets are adjustable with respect to the poles of the magnet and are capable of being secured in any position on said poles by the screws 9. By adjusting the brackets 8 with respect to the poles of the magnet 6 the magnetic attraction between the poles and the rotating shaft 1, which latter is formed of a magnetic metal, such as iron or steel, may be so adjusted as to practically eliminate from the bearings 4 the weight of the shaft and the elements carried thereby. By thus eliminating the weight of the shaft from the bearings the latter act simply as guides and friction is almost entirely removed, so that there will not only be much less wear in the operation of the shaft, but in the case of devices for effecting registration there will be much less error in the registration. By properly adjusting the adjusting-screws 5 5 the shaft 1 may be shifted with respect to the magnetic poles, whereby the weight of the shaft may be accurately balanced with respect to the two poles, so that friction will be equally eliminated or relieved at both of the bearings.

Having now described my invention, what I claim as new, and desire to secure by Letters Patent, is as follows:

1. The combination of a shaft of magnetic metal rotating in a horizontal plane, a bearing for each end of said shaft, a horseshoe-magnet the poles of which carry said bearings and attract the ends of the rotating shaft to relieve the bearings of its weight, and means for adjusting the bearings longitudinally on said magnet so as to increase or decrease the magnetic attraction, substantially as set forth.

2. The combination of a shaft of magnetic metal rotating in a horizontal plane, a bearing for each end of said shaft, a horseshoe-magnet the poles of which attract but do not engage the ends of the rotating shaft to relieve the bearings of its weight, and means for adjusting the shaft laterally with respect to the magnet so as to balance the shaft, substantially as set forth.

3. The combination of a shaft of magnetic metal rotating in a horizontal plane, a bearing for each end of said shaft, a horseshoe-magnet the poles of which attract but do not engage the ends of the rotating shaft to relieve the bearings of its weight, means for adjusting the shaft laterally with respect to the magnet so as to balance the shaft, and means for adjusting the shaft toward or away from the magnet to vary the effect of the magnetic attraction, substantially as set forth.

4. The combination of the shaft 1 of magnetic material, the horseshoe-magnet 6, the adjustable brackets 8, and bearings for the shaft carried in said brackets, substantially as set forth.

5. The combination of the shaft 1 of magnetic material, the horseshoe-magnet 6, the adjustable brackets 8, and adjustable bearings for the shaft carried in said brackets, substantially as set forth.

This specification signed and witnessed this 3d day of October, 1898.

ROGER S. WHITE.

Witnesses:
JNO. R. TAYLOR,
ARCHIE G. REESE.